Feb. 7, 1928.  G. BUFFO  1,658,426

TIRE

Filed June 14, 1924

Guido Buffo
INVENTOR

BY Marks & Clerk
ATTORNEYS

Patented Feb. 7, 1928.

1,658,426

UNITED STATES PATENT OFFICE.

GUIDO BUFFO, OF CORDOBA, ARGENTINA.

TIRE.

Application filed June 14, 1924. Serial No. 720,028.

The object of the invention is to provide an improved tire construction of the kind described and with this object in view the invention consists in certain novel features of construction and arrangement of parts hereinafter described, illustrated in the accompanying drawings, and specifically pointed out in the claims appended hereto.

The ordinary automobile tire when punctured is almost worthless for further travelling, but by building up the same into a number of independent units when one of these same punctures or is otherwise incapacitated the wheel though injured is not put entirely out of commission.

These sections or units are composed of very few parts, are easily assembled, and are held to the wheel but by one nut.

The number of parts or sections used depends to a great extent upon the circumference of the wheel. All of the sections are placed exactly in contact one with the other at their bases, in such a manner that when once they are inflated they form a continuous surface without any crevices or hollows; and when they are all in place the tire has the appearance of the usual one piece tire.

The several units around the wheel act as a rim protector as the ordinary tire does; with the difference that this one being in sections any puncture or injury can be localized immediately and prevented from extending to neighboring parts. Consequently when one of the parts has to be changed it is simply separated from the rim of the wheel by unscrewing but one nut, and the injured member removed from the wheel.

A new unit, either in whole or in part, which can easily be carried, is now inserted in the empty space, is adjusted and fastened by but one nut, and after the inner inflatable member of the unit has been inflated, the tire is ready for use again.

In the accompanying drawings, in which similar numerals of reference indicate similar parts throughout the several views.

Figure 1:
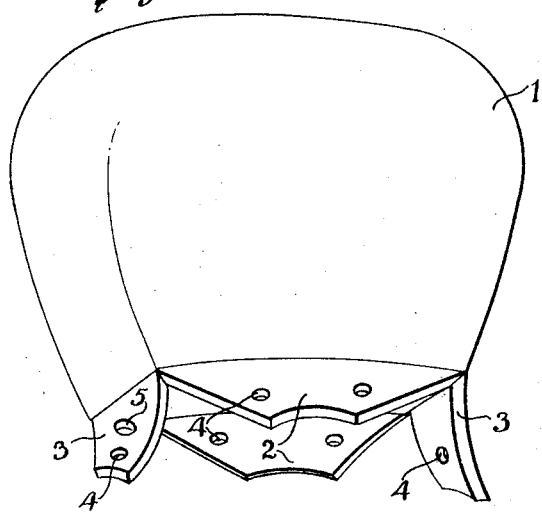
Fig. 1 is a perspective view of the outer casing showing its flaps or wings.
Figure 3:
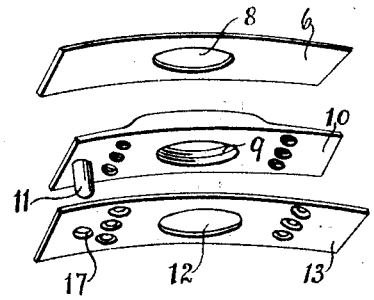
Fig. 3 shows the adjustment plate separated into its component parts.
Figure 2:
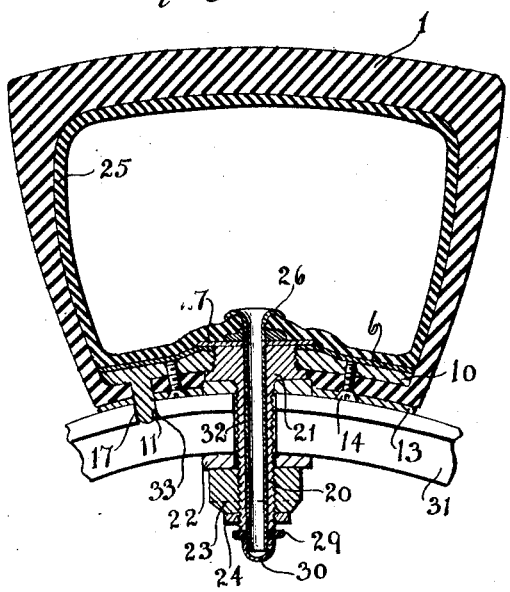
Fig. 2 is a cross sectional view of the inner inflatable member in its inflated position, enclosed by the outer casing and attached to the wheel.
Figure 4:
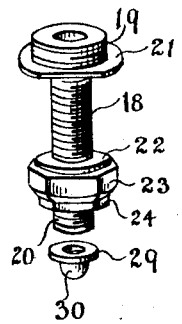
Fig. 4 is a perspective view of the tubular plug for the valve stem.

The invention is constructed substantially and preferably as follows: 1 is the outer casing of the usual construction of outer tubes for automobile tires, with its wings or flaps or curtains 2 and 3, and having perforations 4 and 5. 6 is a lining plate with central opening 8 registering with threaded opening 9 of central plate 10 from which the security peg 11 projects. Opening 12 in closing plate 13 also registers with openings 8 and 9, and countersunk machine screws 14 draw plates 10 and 13 together. Also a perforation 5 is made in one of the said flaps to admit the security peg 11, and an aperture 17 is provided in plate 13 to receive said peg 11.

A tubular plug 18 threaded both at 19 and also at 20 has a collar 21 integral therewith, washer 22, nut 23 and lock nut 24. The portion 19 threads into the tapped portion 9 of the central plate 10.

The inner inflatable member 25 has a valve 26 attached thereto with a large rubber collar plate 27 held by a nut, and smaller rubber plate 29 and cover 30.

In the common tire rim 31 a number of larger perforations 32 are made registering with the tubular plugs 18; and another set of smaller holes or perforations 33 registering with the security pegs 11 for each unit of the tire.

The units or sections can be of any size, but they are usually made small, so that if one should burst the space left between broken and sound sections would be very small and would not prevent the rotation of the wheel should it not be convenient to repair the same immediately.

The replacing can be done without taking off the wheel from the axle or even lifting up the car from the ground, thereby entailing a great saving of time and energy. One simple spare pneumatic unit whose size, weight and several other considerations is only a fraction that of the common tire with one pneumatic chamber, need be carried by the autoist instead of the large heavy spare wheel or spare tire ordinarily carried.

If the rubber portion of the injured unit is so badly damaged that it has to be entirely discarded the metallic parts thereof can be used over again in another unit and when the new unit is replaced the wheel is as sound and in as perfect condition as before the injury. If the rupture of the chamber is not large it can be mended by processes now in common use.

The invention can be applied to wheels now in common use by making the necessary perforations in the rims thereof.

I claim:—

1. A sectional wheel tire formed from a plurality of sections each comprising an inner inflatable member and an outer casing, each of said casings having the side opposite the tread portion formed with an opening to enable said inflatable member to be inserted, flaps extending from the edges of said openings for the insertion of the inflatable member, clamping plate means for holding said flaps in a common plane, and positioning means associated with said clamping plate means for holding said tire sections in assembled position to form a tire.

2. A sectional wheel tire formed from a plurality of sections each comprising an inner inflatable member and an outer casing, each of said casings having the side opposite the tread portion formed with an opening to enable said inflatable member to be inserted, flaps extending from the edges of said openings for the insertion of the inflatable member, clamping plate means comprising a plate placed between said flaps and the inner inflatable member and a second plate placed on the side of said flaps opposite to said first mentioned plate, and positioned relatively to said plate by means extending between said plates, and means associated with said clamping plate means and acting to hold said tire sections in assembled position to form a tire.

3. A sectional wheel tire formed from a plurality of sections, each comprising an inner inflatable member and an outer casing, each of said casings having the side opposite the tread portion formed with an opening to enable said inflatable member to be inserted, flaps extending from the edges of said openings for the insertion of the inflatable member, clamping plate means comprising a plate placed between said flaps and the inner inflatable member and a second plate placed on the side of said flaps opposite to said first mentioned plate, and means projecting from one of said plates into the other plate and serving to clamp the flaps between said plates, and means associated with said clamping plate means and acting to hold said tire sections in assembled position to form a tire.

4. A sectional wheel tire formed from a plurality of sections each comprising an inner inflatable member and an outer casing, each of said casings having the side opposite the tread portion formed with an opening to enable said inflatable member to be inserted, flaps extending from the edges of said openings for the insertion of the inflatable member, clamping plate means comprising a plate placed between said flaps and the inner inflatable member and a second plate placed on the side of said flaps opposite to said first mentioned plate, and means projecting from one of said plates into the other plate and serving to clamp the flaps between said plates, and means associated with said clamping plate means and acting to hold said tire sections in assembled position to form a tire, and a single hollow bolt member attached to one of said clamping plates and serving both to hold the section in position on the wheel and to house a valve member whereby the inflatable member may be inflated.

5. A sectional wheel tire formed from a plurality of sections, comprising an inner inflatable member and an outer casing, said casing having the side opposite the tread portion formed with an opening to enable said inflatable member to be inserted, flaps extending from the edges of said opening for the insertion of the inflatable member, clamping plate means comprising a plate placed between said flaps and the inner inflatable member and a second plate placed on the side of said flaps opposite to said first mentioned plate, and connected to said plate by means extending between said plates, an apertured wheel rim to support said wheel tire section, and a hollow bolt carried by one of said clamping plates, and extending into engagement with said apertured wheel rim and serving both to retain said section upon said wheel rim and to enable said inflatable member to be inflated, and a projecting peg mounted on one of said clamping plates and projecting into engagement with said apertured wheel rim and serving additionally to said hollow bolt to position said tire section upon said apertured wheel rim.

6. A section for sectional wheel tires comprising an inner inflatable member and an outer casing, said casing having the side opposite the tread portion formed with an opening to enable said inflatable member to be inserted, flaps extending from the edges of said opening for the insertion of the inflatable member, a clamping plate arranged between said flaps and said inflatable member, a second plate arranged on the side of said flaps opposite said first mentioned plate, a projecting member carried by said first mentioned plate extending through an aperture in said second mentioned plate, and serving as means to aid in positioning said tire section, a hollow bolt carried by said first mentioned clamping plate, and serving to hold the tire section in position and to carry a valve whereby said inflatable member may be inflated.

In testimony whereof I have affixed my signature.

GUIDO BUFFO.